United States Patent [19]

Teufel et al.

[11] Patent Number: 5,427,852
[45] Date of Patent: Jun. 27, 1995

[54] FILTER TOW AND METHOD FOR ITS MANUFACTURE AS WELL AS TOBACCO SMOKE FILTER ELEMENT AND METHOD FOR ITS MANUFACTURE

[75] Inventors: Eberhard Teufel, Gundelfingen; Rolf Willmund, Emmendingen, both of Germany

[73] Assignee: Rhone-Poulenc Rhodia Aktiengesellschaft, Freiburg, Germany

[21] Appl. No.: 94,611

[22] Filed: Jul. 20, 1993

[30] Foreign Application Priority Data

Jul. 9, 1993 [DE] Germany .................. 43 22 965.4

[51] Int. Cl.$^6$ ................................. D02G 3/00
[52] U.S. Cl. .................... 428/357; 428/359; 428/362; 428/369; 139/331; 536/69
[58] Field of Search ............ 428/362, 369, 357, 375, 428/364, 376, 377, 359; 8/121; 536/69; 139/331

[56] References Cited

U.S. PATENT DOCUMENTS

| | | | |
|---|---|---|---|
| 954,310 | 4/1910 | Lederer | 8/121 |
| 2,780,511 | 2/1957 | Takagi | 8/121 |
| 2,953,837 | 9/1960 | Crawford et al. | 428/369 |
| 3,490,862 | 1/1970 | Yoda et al. | 8/121 |
| 3,649,341 | 3/1972 | Tammela et al. | 8/121 |
| 3,655,326 | 4/1972 | Raton | 8/121 |
| 3,720,661 | 3/1973 | Breton et al. | 8/121 |
| 4,973,503 | 11/1990 | Hotchkiss | 428/357 |

FOREIGN PATENT DOCUMENTS

| | | | |
|---|---|---|---|
| 1081600 | 5/1900 | Germany | 8/121 |
| 1419513 | 2/1969 | Germany | 8/121 |
| 750702 | 6/1956 | United Kingdom | 8/121 |

OTHER PUBLICATIONS

Hawley's Condensed Chemical Dictionary, Nov. 4, 1993, p. 237.

*Primary Examiner*—N. Edwards
*Attorney, Agent, or Firm*—Bucknam and Archer

[57] ABSTRACT

A filter tow of cellulose acetate filaments and/or cellulose acetate staple fibers, has at least the surface of the filaments and staple fibers consisting of a cellulose acetate having an acetyl number of less than 53%, preferably less than 49%. The method for the manufacture of the filter tow comprises the spinning of cellulose acetate filaments from a solution of cellulose acetate having an acetyl number of at least 53% in acetone, if necessary, cutting the filaments into staple fibers, and combining the filaments and/or staple fibers to a filter tow, the filaments or staple fibers being hydrolyzed so that at least the cellulose acetate at the surface of the filaments and staple fibers has an acetyl number of less than 53%, preferably less than 49%. The invention involves also a tobacco smoke filter element made from the filter tow, as well as a method for the manufacture of the tobacco smoke filter element. The new filter tow and the new tobacco smoke filter element are better biodegradable under action of environmental influences, yet their storage under conditions customary today is possible without the danger of microbiological degradation.

8 Claims, No Drawings

FILTER TOW AND METHOD FOR ITS MANUFACTURE AS WELL AS TOBACCO SMOKE FILTER ELEMENT AND METHOD FOR ITS MANUFACTURE

FIELD OF THE INVENTION

This invention relates to a filter tow, consisting of cellulose acetate filaments and/or cellulose acetate staple fibers. The invention further relates to a method for the manufacture of such a filter tow by essentially spinning cellulose acetate filaments by extruding a solution of cellulose acetate having an acetyl number of at least 53% in acetone through a multi-hole spinneret and if necessary subsequent cutting of the cellulose acetate filaments into cellulose acetate staple fibers and combining a plurality of cellulose acetate filaments and/or the staple fibers thus obtaining a filter tow.

The invention also relates to a tobacco smoke filter element, consisting of a section of a filter tow of cellulose acetate filaments and/or cellulose acetate staple fibers compacted traverse-axially and hardened by means of a cellulose acetate plasticizer or an adhesive.

Finally, the invention relates to a method for manufacturing such a tobacco smoke filter element by providing a filter tow consisting of cellulose acetate filaments and/or cellulose acetate staple fibers with a cellulose acetate plasticizer or an adhesive, subsequent transverse-axial compacting, and if necessary, wrapping this filter tow with a wrapping strip, cutting the filter tow thus compacted and if necessary, wrapping into individual tobacco smoke filter rods, and lastly cutting these filter rods into individual tobacco smoke filter elements.

BACKGROUND OF THE INVENTION

Cigarette filters disintegrate relatively slowly and are therefore an annoyance to broad sections of the population in places where there is much smoking.

For most cigarette filters, fibrous cellulose acetate is being used today having an acetyl number between 53 and 57% (such as for example described in U.S. Pat. No. 2,953,837. The numerical values cited in this patent, namely 38% to 41% for the acetyl content, correspond to the above mentioned values of 53 to 57% for the acetyl number).

Compared with other polymers, in particular synthetic ones, such a cellulose acetate is indeed biodegradable, but the time spans after which cigarette filters of such a fibrous material have disappeared at least optically under the action of environmental influences are too long in today's estimation.

German patent application 40 13 293 and German patent application 40 13 304 describe cigarette filters which under the action of environmental influences are decomposable relatively quickly, but these cigarette filters consist of a section of a transverse-axially compacted fiber skein of fibers of spun PHB (polyhydroxybutyric acid) or a copolymer of PHB and PHV (polyhydroxyvaleric acid). At present, such polymers are not being used for the manufacture of filter tow and tobacco smoke filter elements, or at least not to a noteworthy extent, which may be due to the insufficient industrial availability of this polymer;
the effect on the taste of the smoke different from cellulose acetate and
as yet unclarified technological problems in processing such polymers to filter tow and tobacco smoke filter elements (for example in connection with the hardening of such tobacco smoke filter elements or in connection with the use of problematical solvents in the spinning of threads from these polymers).

From German patent application 39 14 022, new plastic materials easily biodegradable are known by composting and their use for the manufacture of sheaths/containers for oil lamps, eternal light oil candles, composition oil lamps, other grave lamp models, sacrificial lamps and foils. As plastic materials there are named in German disclosure 39 14 022 those materials based on cellulose esters, such as cellulose acetate, with additions, such as polyester, citric acid esters, phosphoric acid esters and organic iron compounds. However, German patent application 39 14 022 gives no indication of the possibility of accelerating the biodegradation of filter tow and tobacco smoke filter elements. Besides, the formulation described in German patent application 39 14 022 is not suitable for the production of filter tow and tobacco smoke filter elements because of too high a proportion of plasticizer in the cellulose acetate.

Recently the microbiological decomposition of cellulose acetate under a variety of environmental conditions has been described in scientific publications. Thus, for example, the publication DEGRATION OF CELLULOSE ACETATE FILTERS IN AQUEOUS SYSTEMS by Eberhard Teufel and Rolf Willmund, read as a paper at the "JOINT MEETING OF SMOKE AND TECHNOLOGY GROUPS" of the CORESTA on Sep. 16, 1991 in Utrecht, Netherlands, describes the mechanism of the biological degradation of cellulose acetate. Another publication, namely "THE FATE OF CELLULOSE ACETATE IN THE ENVIRONMENT: AEROBIC BIODEGRADATION OF FILTER TOW FIBERS" by Charles M. Buchanan, Robert M. Gardner, Ronald J. Komarek and David Strickler, read as a paper at the "TOBACCO CHEMIST RESEARCH CONFERENCE" on Oct. 22, 1991 in Asheveille, N.C., U.S.A., describeds the aerobic degradation of cellulose acetate.

Another publication, namely "Effects of Natural Polymer Acetylation of the Anaerobic Bioconversion to Methane and Carbon Dioxide", by C. J. Rivard et al, published in Applied Biochemistry and Biotechnology, Volume 34/35, 1992, pages 725 to 736, describes the anaerobic degradation of cellulose acetate.

It is evident from all three above-mentioned publications that aerobic as well as anaerobic decomposition of cellulose acetate takes place faster with decreasing acetyl number. The above publications, however, give no hint of the possibility of accelerating the biodegradation of filter tow and tobacco smoke filter elements consisting of cellulose acetate; especially the two last-named publications show that the biodegradation of cellulose acetate can be accelerated by lowering its acetyl number, but they say nothing about how this could be technically realizable for filter tow and tobacco smoke filter elements of cellulose acetate fiber material.

A synoptic view of the prior art shows, therefore, that for filter tow and tobacco smoke filter elements consisting of cellulose acetate fiber materials as well as tobacco smoke filter elements made of such filter tow, no solution for accelerating their biodegradation is as yet known.

SUMMARY OF THE INVENTION

It is, therefore, the object of the invention to make available a filter tow consisting of cellulose acetate filaments and/or cellulose acetate staple fibers which shows improved biodegradation under the action of environmental influences.

It is also an object of the invention to make available a method for the manufacture of such a filter tow.

Still another object of the invention is to make available a tobacco smoke filter element consisting of a section of a filter tow of cellulose acetate filaments and/or cellulose acetate staple fibers, transverse-axially compacted and hardened by means of a cellulose acetate plasticizer or an adhesive, which shows improved biodegradation under the action of environmental influence.

Finally, it is an object of the invention also to provide a method for the manufacture of such a tobacco smoke filter element.

With respect to the filter tow, the problem is solved by a filter tow consisting of cellulose acetate filaments and/or cellulose acetate staple fibers which is characterized by the fact that at least the surface of the cellulose acetate filaments and of the cellulose acetate staple fibers consists of a cellulose acetate having an acetyl number of less than 53%, preferably less than 49%.

With respect to the method for the manufacture of the filter tow, the problem is solved by a method for the manufacture of a filter tow by essentially spinning cellulose acetate filaments by extruding a solution of cellulose acetate having an acetyl number of at least 53% in acetone through a multi-hole spinneret and if necessary, subsequently cutting the cellulose acetate filaments into cellulose acetate staple fibers and combining a plurality of the cellulose acetate filaments and/or staple fibers thus obtained to a filter tow, the method being characterized by the fact that the cellulose acetate filaments or cellulose acetate staple fibers are subjected to a hydrolysis treatment such that at least the cellulose acetate of these filaments and staple fibers present at the surface shows after the hydrolysis treatment an acetyl number of less than 53%, preferably less than 49%.

or as filter tow there is used one in which the cellulose acetate which the cellulose acetate filaments and the cellulose acetate staple fibers consist of, is soluble in acetone and has an acetyl number of at least 53%, and the cellulose acetate filaments or staple fibers are subjected to a hydrolysis treatment such that at least the cellulose acetate of these filaments and staple fibers present at the surface shows after the hydrolysis treatment an acetyl number of less than 53%, preferably less than 49%.

Preferably the hydrolysis treatment is carried out with caustic soda solution or with gaseous ammonia.

In addition, it is preferred that the hydrolysis treatment with gaseous ammonia be carried out on the tobacco smoke filter rods or on the tobacco smoke filter elements.

Naturally, the hydrolysis treatment according to the invention can be carried out with hydrolizing agents other than sodium hydroxide and ammonia, for example with other strong bases or acids, or even the ester-splitting enzymes, such as esterases.

By a filter tow within the scope of the invention must be understood a band of a plurality of cellulose acetate filaments and/or cellulose acetate staple fibers (of the definition of the term "filter tow" for example in German patent application 41 09 603). Preferably the filter tow of the invention is a band of a plurality of cellulose acetate filaments, that the filaments are capable of being crimped particularly under compression in a crimping machine.

By a filament is to be understood a practically endless fiber, and the term "staple fiber" means a fiber of limited length (concerning these two definitions see "Rompps Chemie-Lexikon," 8th revised and enlarged edition, Franckh'sche Verlagshandlung, W. Keller & Co., Stuttgart/1987, resp. Volume 2, page 1283, and Volume 5, page 3925—with reference to DIN 60 001 T2 of December 1974).

The tobacco smoke filter element according to the invention is preferably a cigarette filter, but it may also be a filter for cigars, cigarillos or tobacco pipes.

The term Acetyl number means within the scope of the invention the proportion of bound acetic acid in the cellulose acetate, expressed in mass percent (cf. Ullman's Encyclopedia of Industrial Chemistry, Fifth, Completely Revised Edition, Volume A 5, pages 444 and 445—VCH Verlagsgesellschaft mbH, D-6940 Weinheim, Federal Republic of Germany 1986).

The following advantages are achieved with the invention:

As to the filter tow and the tobacco smoke filter element of the invention, they show, as compared with known filter tow and known tobacco smoke filter elements of cellulose acetate fiber material, an acceleration of the rotting rate under environmental influences; yet storage of the filter tow and tobacco smoke filter element of the invention under conditions customary today is readily possible without danger of microbiologic degradation.

It is of special advantage that for the manufacture of the filter tow of the invention, one can start with conventional methods for the manufacture of a filter tow consisting of cellulose acetate fiber material, but with the additional new measure of the hydrolysis one obtains a filter tow the cellulose acetate filaments or staple fibers of which have at least at their surface, a cellulose acetate with an acetyl number of less than 53%, preferably less than 49%, due to which the filter tow of the invention shows an accelerated microbiological decomposition. By way of explanation it should be mentioned that the cellulose acetate with the desired acetyl number of less than 49% of the accelerated microbiological degradation is not soluble in acetone and hence cannot be spun to filaments by the conventional spinning method (with acetone as solvent).

By preserving the principle of the conventional method for the manufacture of a filter tow consisting of cellulose acetate fiber material., also the investment costs for the apparatus for carrying out the new method for the manufacture of the filter tow according to the invention can be kept low (with the existing apparatus, only an additional system for the hydrolysis is required for carrying out the method according to the invention).

The same applies to the manufacture of the tobacco smoke filter element according to the invention: Here again one preserves the principle of the conventional method for the manufacture of a tobacco smoke filter element consisting of cellulose acetate fiber material, and the additional new measure(s) is/are inexpensive.

The invention will be explained more specifically below with reference to examples.

COMPARATIVE EXAMPLE

A cellulose acetate spinning solution having a solids content of 28 mass % cellulose acetate and 0.5 mass % titanium dioxide in acetone was prepared. The water content of this spinning solution was adjusted to 3 mass %. The cellulose acetate used has an acetyl number of 55.4% and a degree of polymerization (DP) of 220. This spinning solution was filtered and spun by dry spinning on a conventional filter tow spinning installation. The cellulose acetate filaments formed were combined to a band, crimped by means of a crimping machine under compression and dried in a drum dryer. On entering the crimping machine, the aforesaid band had an entrance speed of 550 m/min. The stay of the band of crimped cellulose acetate filaments in the drum dryer was 5 minutes. The filter tow of cellulose acetate filaments from the crimping machine thus obtained was at first deposited loosely by means of a packing machine and then compressed to a bale; the bale had a residual moisture of 5.5 mass %.

The specification of the filter tow thus made was 3 Y 35 HK. This designation means:

| Filament titer | 3.3 dtex |
|---|---|
| Total titer | 38,500 dtex |
| Cross-sectional form of the cellulose acetate filaments | Y |

The data on the biodegradation of the filter tow made according to the comparison example are shown in the table hereinbelow (after the examples).

EXAMPLE 1

A spinning solution as in the comparative example was prepared. With this spinning solution, as in the comparative example, filter tow of cellulose acetate filaments was produced from the crimping machine under compression, but with the difference that during the manufacture of this filter tow, immediately after the crimping machine, a 1-molar caustic soda solution was sprayed onto the filter tow consisting of crimped cellulose acetate filaments. The quantity of applied caustic soda solution was 6 liters per hour. The filter tow, before drying in the drum dryer, was passed through a drying conveyor, the air of temperature of 80° C. in the drying conveyor being saturated with water vapor. The stay of the filter ton in the drying conveyor was 7 minutes.

Subsequently, as in the comparative example, the filter tow was dried in the drum dryer to a residual moisture of 5.5 mass %, deposited, and compressed to a bale.

The specification of the filter tow thus produced corresponded to the specification of the filter tow made according to the comparative example.

After a storage time of three weeks, the packed bale was opened, a sample was taken from this bale, and on it the acetyl number and the residual alkali content was determined. In addition, the solubility of the filter tow in acetone was determined using the sample.

The results were as follows:

| Acetyl number | 53.2% |
|---|---|
| Residual alkali content | 0.006% |
| Solubility | The solution of the filter tow in acetone (3%) contained clearly visible amounts of insoluble parts. |

As has been mentioned in the comparative example, the data on biodegradation of the filter tow made according to Example 1 are listed in a table (after the examples).

EXAMPLE 2

1 kilogram of the filter tow made according to the comparative example was hydrolyzed under laboratory conditions as follows:

The filter tow was placed in a vessel and the vessel was closed. The filter tow in the closed vessel was successively exposed for one hour in each instance to the action of
water vapor
ammonia vapor
carbon dioxide gas.
Between the above described stages the vessel was evacuated. The above-mentioned three-stage treatment was repeated three times. Subsequently the filter tow was removed from the vessel and tested for acetyl number and solubility. The results were as follows:

| Acetyl number | 45% |
|---|---|
| Solubility | The solution of the filter tow in acetone (3%) contained clearly visible amounts of insoluble parts. |

As has been mentioned in the comparative example and Example 1, the data on biodegradation of the filter tow, according to Example 2 are listed in the following table.

Test of Biodegradability Under Controlled Microbiological Conditions

To verify the acceleration resulting from the method according to the invention of the biodegradation under defined microbiological conditions, a modified test method for water-insoluble samples were developed in anology to the degradation test for water-soluble substances described in DIN 38 409 H52.

According to this modified test procedure, the microbiological degradation is determined by measuring the oxygen consumption of the microorganisms during the degradation process.

The oxygen consumption is determined by pressure gauge. The carbon dioxide formed by the metabolism of the microorganisms is bound by sodium hydroxide and thus does not affect the pressure measurement.

In each test, 200 mg filter tow for the comparative example, Example 1 and Example 2 were placed in the mineral nutrient solution. The soil bacteria needed for the microbiological degradation were obtained from soil filtrate. Each of the nutrient solutions was seeded with 2 ml of this soil filtrate solution.

The percent loss of mass of the samples calculated from the oxygen consumption is listed in the following table.

|  | % weight loss after days | | |
| --- | --- | --- | --- |
|  | 20 | 40 | 60 |
| Filter tow in the comparative example | 0.5 | 1.3 | 2.5 |
| Filter tow in Example 1 | 0.7 | 2.5 | 7 |
| Filter tow in Example 2 | 5 | 13 | 20 |

What is claimed is:

1. A filter tow consisting of a material selected from the group consisting of crimped cellulose acetate filaments and cellulose acetate staple fibers, and mixtures thereof wherein said cellulose acetate filaments and cellulose acetate staple fibers at least on the surface thereof consist of a cellulose acetate having an acetyl number less than 49%, and wherein at least on the surface they are insoluble in acetone.

2. The filter tow according to claim 1, which consists only of cellulose acetate filaments.

3. A filter tow consisting of cellulose acetate filaments made by the steps of:
   a) spinning cellulose acetate by extruding a solution of cellulose acetate having an acetyl number of at least 53% in acetone through a multi-hole spinneret whereby cellulose acetate filaments are obtained;
   b) combining a plurality of said cellulose acetate filaments from step a) to a filter tow;
   c) subjecting said filter tow from step b) to a hydrolysis treatment whereby the cellulose acetate filaments at least at the surface thereof have after the hydrolysis an acetyl number of less than 53% and at least at the surface thereof are insoluble in acetone.

4. The filter tow according to claim 3 wherein the acetyl number after hydrolysis is less than 49%, 5. A filter tow consisting of cellulose acetate fibers made by the steps of:
   a) spinning cellulose acetate filaments by extruding a solution of cellulose acetate having an acetyl number of at least 53% in acetone through a multihole spinnerette whereby cellulose acetate filaments are obtained;
   b) cutting said cellulose acetate filaments from step a) to cellulose acetate fibers;
   c) combining a plurality of said cellulose acetate fibers from step b) to a filter tow;
   d) subjecting said filter tow from step c) to a hydrolysis treatment whereby the cellulose acetate fibers at least at the surface thereof have after hydrolysis an acetyl number less than 53% and at least at the surface thereof are insoluble in acetone.

6. The filter tow according to claim 5 wherein the acetyl number after hydrolysis is less than 49%.

7. The filter tow according to claim 3 wherein the hydrolysis is carried out with caustic soda solution or gaseous ammonia.

8. The filter tow according to claim 5, wherein the hydrolysis is carried out with caustic soda solution or with gaseous ammonia.

* * * * *